US012223595B2

(12) United States Patent
Shreve et al.

(10) Patent No.: US 12,223,595 B2
(45) Date of Patent: Feb. 11, 2025

(54) METHOD AND SYSTEM FOR MIXING STATIC SCENE AND LIVE ANNOTATIONS FOR EFFICIENT LABELED IMAGE DATASET COLLECTION

(71) Applicant: Palo Alto Research Center Incorporated, Palo Alto, CA (US)

(72) Inventors: Matthew A. Shreve, Mountain View, CA (US); Jeyasri Subramanian, Sunnyvale, CA (US)

(73) Assignee: Xerox Corporation, Norwalk, CT (US)

( * ) Notice: Subject to any disclaimer, the term of this patent is extended or adjusted under 35 U.S.C. 154(b) by 114 days.

(21) Appl. No.: 17/879,480

(22) Filed: Aug. 2, 2022

(65) Prior Publication Data

US 2024/0046568 A1 Feb. 8, 2024

(51) Int. Cl.
*G06T 17/20* (2006.01)
*G06V 10/70* (2022.01)
*G06V 20/64* (2022.01)
*G09G 5/37* (2006.01)

(52) U.S. Cl.
CPC .............. *G06T 17/20* (2013.01); *G06V 20/64* (2022.01); *G06T 2219/004* (2013.01)

(58) Field of Classification Search
CPC . G06T 17/20; G06T 2219/004; G06T 15/003; G06T 17/00; G06T 19/00; G06T 19/006; G06T 19/20; G06T 2200/04; G06T 2200/08; G06T 2207/10028; G06T 2219/00; G06V 20/64; G06V 20/10; G06V 10/70; G06V 10/75; G09G 5/377; G09G 2340/10–12
See application file for complete search history.

(56) References Cited

U.S. PATENT DOCUMENTS 10,147,023 B1 * 12/2018 Klaudiny ................ G06T 13/40
10,229,539 B2    3/2019 Shikoda
10,304,159 B2    5/2019 Aoyagi
10,366,521 B1    7/2019 Peacock
(Continued)

OTHER PUBLICATIONS

Kevin Lai et al., "A Large-Scale Hierarchical Multi-View RGB-D Object Dataset", Robotics and Automation (ICRA), 2011 IEEE International Conferene on, IEEE, May 9, 2011, pp. 1817-1824. *abstract* * Section IV* * Figure 6 *.
(Continued)

*Primary Examiner* — Wesner Sajous

(57) ABSTRACT

A system is provided which mixes static scene and live annotations for labeled dataset collection. A first recording device obtains a 3D mesh of a scene with physical objects. The first recording device marks, while in a first mode, first annotations for a physical object displayed in the 3D mesh. The system switches to a second mode. The system displays, on the first recording device while in the second mode, the 3D mesh including a first projection indicating a 2D bounding area corresponding to the marked first annotations. The first recording device marks, while in the second mode, second annotations for the physical object or another physical object displayed in the 3D mesh. The system switches to the first mode. The first recording device displays, while in the first mode, the 3D mesh including a second projection indicating a 2D bounding area corresponding to the marked second annotations.

19 Claims, 11 Drawing Sheets

(56) References Cited

U.S. PATENT DOCUMENTS

| | | | | |
|---|---|---|---|---|
| 10,417,781 | B1* | 9/2019 | Konolige | G06T 7/60 |
| 10,696,165 | B2* | 6/2020 | Bennett | B60L 53/14 |
| 11,182,649 | B2* | 11/2021 | Tremblay | G06T 15/00 |
| 11,200,457 | B2* | 12/2021 | Shreve | G06V 20/64 |
| 11,256,958 | B1* | 2/2022 | Subbiah | G06F 18/2155 |
| 11,776,215 | B1* | 10/2023 | Cheng | G06T 19/00 345/419 |
| 2008/0189083 | A1 | 8/2008 | Schell | |
| 2010/0040272 | A1* | 2/2010 | Zheng | G06V 10/751 600/410 |
| 2012/0200601 | A1 | 8/2012 | Osterhout | |
| 2013/0127980 | A1 | 5/2013 | Haddick | |
| 2015/0037775 | A1 | 2/2015 | Ottensmeyer | |
| 2016/0260261 | A1 | 9/2016 | Hsu | |
| 2016/0292925 | A1 | 10/2016 | Montgomerie | |
| 2016/0328887 | A1 | 11/2016 | Elvezio | |
| 2016/0335578 | A1 | 11/2016 | Sagawa | |
| 2016/0349511 | A1 | 12/2016 | Meiron | |
| 2017/0366805 | A1* | 12/2017 | Sevostianov | H04N 13/398 |
| 2018/0035606 | A1 | 2/2018 | Burdoucci | |
| 2018/0204160 | A1 | 7/2018 | Chehade | |
| 2018/0315329 | A1 | 11/2018 | D'Amato | |
| 2018/0336732 | A1 | 11/2018 | Schuster | |
| 2019/0156202 | A1* | 5/2019 | Falk | G06N 3/045 |
| 2019/0362556 | A1 | 11/2019 | Ben-Dor | |
| 2020/0081249 | A1 | 3/2020 | Brusnitsyn | |
| 2020/0210780 | A1 | 7/2020 | Torres | |
| 2021/0243362 | A1* | 8/2021 | Castillo | G06V 10/26 |
| 2021/0287718 | A1* | 9/2021 | Lyons | G06V 10/774 |
| 2021/0350588 | A1 | 11/2021 | Tanida | |
| 2022/0180224 | A1* | 6/2022 | Tommasi | G06N 5/04 |

OTHER PUBLICATIONS

Georgios Georgakis et al., "Multiview RGB-D Dataset for Object Instance Detection", 2016 Fourth International Conference on 3D Vision (3DV), Sep. 26, 2016, pp. 426-434. * Abstract* * Section 3 *.

Aldoma Aitor et al., "Automation of "Ground Truth" Annotation for Multi-View RGB-D Object Instance Recognition Datasets", 2014 IEEE/RSJ International Conference on Intelligent Robots and Systems, IEEE, Sep. 14, 2014, pp. 5016-5023. * abstract* * Section III *.

Pat Marion et al., "LabelFusion: A Pipeline for Generating Ground Truth Labels for Real RGBD Data of Cluttered Scenes", Jul. 15, 2017, retrieved form the Internet: URL: https://arxiv.org/ pdf/1707.04796.pdf. * abstract* * Section 111 *.

Alhaija et al., "Augmented Reality Meets Computer Vision: Efficient Data Generation for Urban Driving Scenes", Aug. 4, 2017.

Kaiming He, Georgia Gkioxari, Piotr Dollar Ross Girshick, "Mask R-CNN", arXiv:1703.06870v1 [cs.CV] Mar. 20, 2017.

Umar Iqbal, Anton Milan, and Juergen Gall, "PoseTrack: Joint Multi-Person Pose Estimation and Tracking ", arXiv: 1611.07727v3 [ cs.CV] Apr. 7, 2017.

Ohan Oda, et al.; "Virtual replicas for remote assistance in virtual and augmented reality", Proceedings of the 28th Annual ACM Symposium on User Interface Software & Technology, Nov. 8-11, 2015, Charlotte, NC, pp. 405-415 (Year: 2015).

Mueller, How To Get Phone Notifications When Your Brother HL-3170CDW Printer Runs Out Of Paper, https://web.archive.org/web/20180201064332/http://www.shareyourrepair.com/2014/12/how-to-get-push-notifications-from-brother-printers-with-gmail-boxcar.html (Year: 2018).

Epson Printer Says Out of Paper but It Isn't, https://smartprintsupplies.com/blogs/news/p-strong-epson-printer-says-out-of-paper-but-it-isnt-strong-p-p-p (Year: 2018).

Adepu et al. Control Behavior Integrity for Distributed Cyber-Physical Systems (Year: 2018).

Khurram Soomro "UCF101: A Dataset of 101 Human Actions Classes From Videos in The Wild" Dec. 2012.

J. L. Pech-Pacheco et al."Diatom autofocusing in brightheld microscopy: a comparative study" IEEE 2000.

Said Pertuz et al "Analysis of focus measure operators in shape-from-focus", Research gate Nov. 2012, Article Received Jun. 3, 2011, Revised form Oct. 15, 2012, Accepted Nov. 7, 2012, Available priline Nov. 16, 2012.

* cited by examiner

METHOD AND SYSTEM FOR MIXING STATIC SCENE AND LIVE ANNOTATIONS FOR EFFICIENT LABELED IMAGE DATASET COLLECTION

RELATED APPLICATION

This application is related to:

U.S. Pat. No. 10,699,165, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 29 Nov. 2017 and issued 30 Jun. 2020 (hereinafter "U.S. Pat. No. 10,699,165"), and U.S. Pat. No. 11,200,457, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 23 Apr. 2020 and issued 14 Dec. 2021 (hereinafter "U.S. Pat. No. 11,200,457"), where U.S. Pat. Nos. 10,699,165 and 11,200,457 claim the benefit and priority of U.S. Provisional Application No. 62/579,000, entitled "SYSTEM AND METHOD USING AUGMENTED REALITY FOR EFFICIENT COLLECTION OF TRAINING DATA FOR MACHINE LEARNING," by inventors Matthew A. Shreve, Sricharan Kallur Palli Kumar, Jin Sun, Gaurang R. Gavai, Robert R. Price, and Hoda M. A. Eldardiry, filed 30 Oct. 2017; and U.S. application Ser. No. 17/840,358, entitled "SYSTEM AND METHOD FOR INTERACTIVE FEEDBACK IN DATA COLLECTION FOR MACHINE LEARNING IN COMPUTER VISION TASKS USING AUGMENTED REALITY," by inventors Matthew A. Shreve and Robert R. Price, filed 14 Jun. 2022 (hereinafter "U.S. patent application Ser. No. 17/840,358");

the disclosures of which are incorporated by reference herein.

BACKGROUND

Field

This disclosure is generally related to computer vision systems. More specifically, this disclosure is related to a method and system for mixing static scene and live annotations for efficient labeled image dataset collection.

Related Art

Currently, in machine learning and computer vision systems, a common approach in creating datasets for novel objects involves deploying human technicians to the field to capture images of objects from different poses and under different lighting conditions, or to crowd source images obtained from clients or public sources. Upon obtaining these images (which may comprise a significant number of images in a large database), human labelers may manually label each individual image (e.g., by drawing a bounding box around the object or by using an annotation tool). Given the intensive nature of the labeling process, such a task may require a significant number of human-hours. While some existing tools may improve this process, the challenge remains to provide improvements and a significant reduction in the number of human-hours necessary in collecting and creating labeled training data.

SUMMARY

One embodiment provides a system which facilitates mixing static scene and live annotations for labeled dataset collection. During operation, the system obtains, by a first recording device, a three-dimensional (3D) mesh of a scene with a plurality of physical objects. The system marks, by the first recording device while in a first mode, first annotations for a physical object displayed in the 3D mesh. The system switches from the first mode to a second mode. The system displays, on the first recording device while in the second mode, the 3D mesh including a first projection indicating a two-dimensional (2D) bounding area corresponding to the marked first annotations. The system marks, by the first recording device while in the second mode, second annotations for the physical object or another physical object displayed in the 3D mesh. The system switches from the second mode to the first mode. The system displays, on the first recording device while in the first mode, the 3D mesh including a second projection indicating a 2D bounding area corresponding to the marked second annotations.

In a variation on this embodiment, the 3D mesh is captured by the first recording device or another recording device and stored on a first computing device. The system stores the marked first annotations on the first computing device and stores the marked second annotations on the first computing device.

In a further variation, the first mode comprises an online mode in which a first user associated with the first recording device moves around the scene to mark the first annotations in a live view setting, and the second mode comprises an offline mode in which the first user associated with the first recording device uses tools on the first recording device to mark the second annotations in a static view setting.

In a further variation, the 3D mesh with the first projection is retrieved by and displayed on a second computing device associated with the first user, and the first user marks the second annotations using the second computing device while in the offline mode.

In a further variation, the 3D mesh with the second projection is displayed on the first recording device while in the offline mode.

In a further variation, the 3D mesh with the first projection is retrieved by and displayed on a third computing device associated with a second user, and the second user marks the second annotations using the third computing device while in an offline mode.

In a further variation, the 3D mesh with the second projection is displayed on the third computing device while in the offline mode.

In a further variation, the system performs at least one of: editing, using the second computing device or the third computing device while in the second mode, the first or second annotations for the physical object; and editing, using the first recording device while in the first mode or the second mode, the first or second annotations for the physical object.

In a further variation, the system captures, by the first recording device while in the online mode, additional images of the scene based on instructions provided to the first user and displayed on the first recording device.

In a further variation, the system stores data associated with the plurality of physical objects, wherein the data includes one or more of: a 3D real-world location of a respective physical object; a projected view of the respective physical object; a class or description of the respective physical object; a state associated with the respective physical object; and metadata associated with an image of the respective physical object.

In a further variation, marking the first or second annotations for the physical object comprises one or more of: creating or selecting a class associated with the physical object; storing the class on the first computing device; creating or selecting a status associated with the physical object; and storing the status on the first computing device.

In a further variation, the system allows a plurality of users associated with recording devices or computing devices to mark annotations for any physical object displayed in a same 3D mesh in the first mode and the second mode. The system stores the annotations marked by the plurality of users. The system displays, for the plurality of users on a respective recording device or a respective computing device, corresponding projections indicating 2D bounding areas in real time as a respective annotation is marked and stored.

In a further variation, marking the first annotations and marking the second annotations comprises indicating a 3D bounding area corresponding to the physical object.

BRIEF DESCRIPTION OF THE FIGURES

In the figures, like reference numerals refer to the same figure elements.

DETAILED DESCRIPTION

Figure 1A:
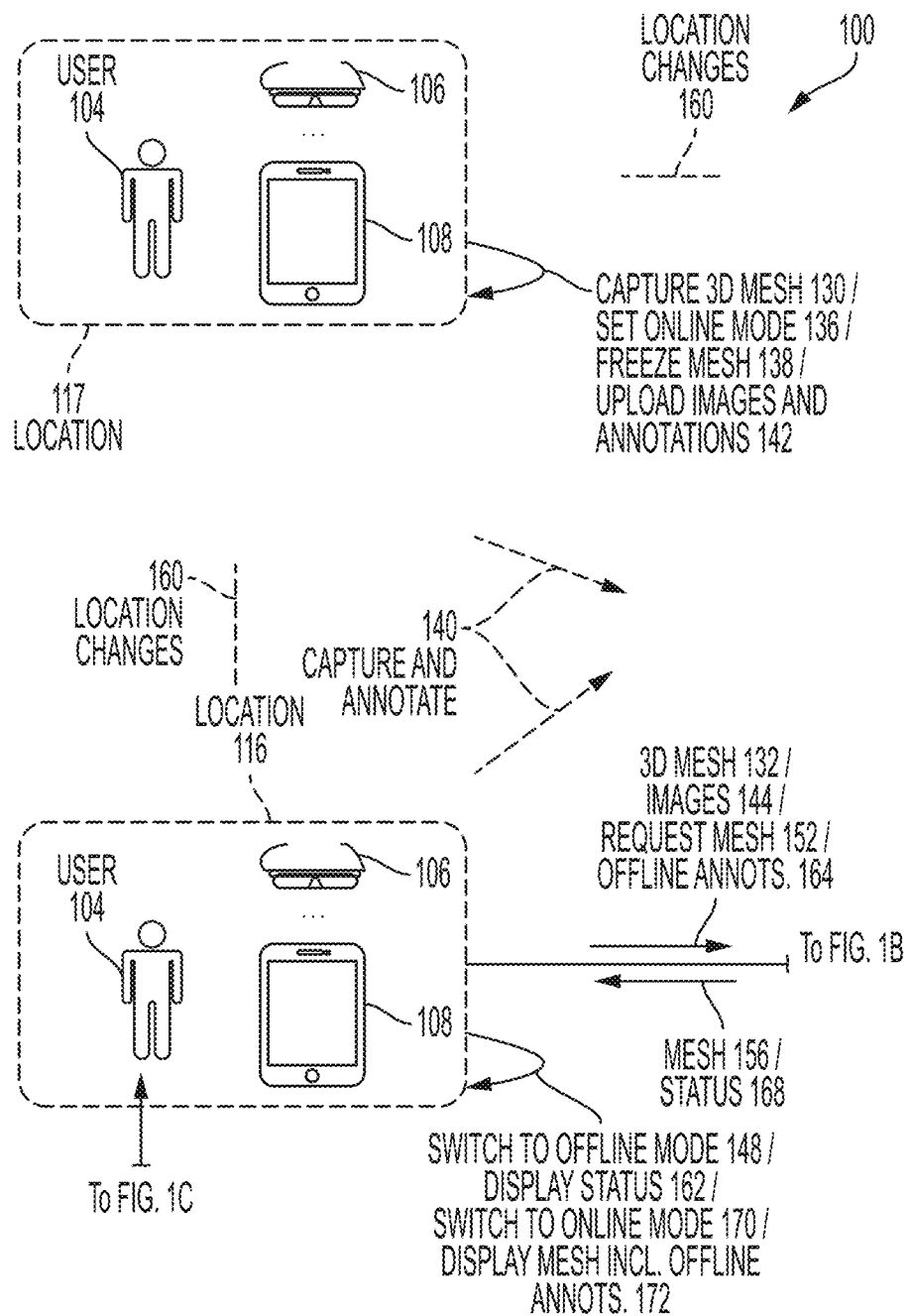
FIGS. 1A, 1B, and 1C illustrate an exemplary environment for facilitating mixing static scene and live annotations for labeled dataset collection, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described here provide a system which improves the efficiency of collecting labeled training data, by allowing a user to mark annotations on physical objects in a scene as represented by a 3D mesh or an AR world map, while the user is in either a live view mode (e.g., an online mode on an AR or other recording device) or a static scene mode (e.g., an offline mode on a computing device or tablet with a touch screen). The system stores the marked annotations and projects 2D annotations corresponding to the marked annotations in subsequent views of the 3D mesh, in either online or offline mode. The marked annotations and projected 2D annotations can be used a labeled data to train a machine learning model or a computer vision system.

Currently, in machine learning and computer vision systems, a common approach in creating datasets for novel objects involves deploying human technicians to the field to capture images of objects from different poses and under different lighting conditions, or to crowd source images obtained from clients or public sources. Upon obtaining these images (which may comprise a significant number of images in a large database), human labelers may manually label each individual image (e.g., by drawing a bounding box around the object or by using an annotation tool). Given the intensive nature of the labeling process, such a task may require a significant number of human-hours. While some existing tools may improve this process, the challenge remains to provide improvements and a significant reduction in the number of human-hours necessary in collecting and creating labeled training data.

As an example, in building a robust visual object detector for novel objects or object parts, a technician must capture and label images of an object under a variety of conditions, including, e.g., from different locations (angle and pose), under different lighting conditions, with partial obstructions, and a varying amount of blur. U.S. Pat. Nos. 10,699,165 and 11,200,457 describe a method and system for accelerated labeling of images using projection of 3D labels anchored in a world frame (based on Simultaneous Localization and Mapping (SLAM) techniques) into 2D image frames. The 3D labels may be created by technicians placing a single AR holographic annotation (e.g., a 3D bounding box) over each object in a particular scene, which single annotation is subsequently automatically projected as a 2D image frame or 2D annotations (e.g., a 2D bounding area) to any captured image.

In some instances, it may be desirable to mark the annotations using a live view of the scene, e.g., using an AR headset or a tablet while walking or moving around the scene, as described below in relation to FIG. 1 and in U.S. Pat. Nos. 10,699,165 and 11,200,457. However, in other instances, it may be desirable to mark the annotations in a "frozen" or static view of the scene, e.g., while sitting at a desk and using a large monitor and a mouse. Static scene annotation may be particularly useful in situations where holding up a tablet for an extended period of time may result in an onerous and unnecessary burden for the user or technician, e.g.: a network hub with many small ports which each require an individual label; an electrical panel with many components which each require an individual label; and any object with many parts which each require an individual label. Thus, the challenge remains to provide a system which can further reduce the number of human-hours necessary to collect a labeled dataset, which can be used to train a machine model or a computer vision system.

The instant embodiments address this challenge by providing a system which allows a user to capture or obtain a 3D mesh of a scene with physical objects which require labeling, and to label the objects by using either or both an online mode (live view of the scene) and an offline mode (static view of the scene). In the online mode, the user may mark first annotations using an AR device or other recording device and tools as described below in relation to FIGS. 3A and 3B. These marked first annotations can be stored with the 3D mesh of the scene (i.e., the AR world map).

Subsequently, the user may switch to an offline mode. In the offline mode, the user may view the 3D mesh with all saved annotations projected as 2D annotations. The projected 2D annotations may correspond to annotations made by other users to the same 3D mesh (either in online or offline mode). That is, the 3D mesh with the first annotations and all the projected 2D annotations can be retrieved and updated by multiple users of multiple computing devices. While in the offline mode, the user may mark second annotations by using the same recording device used to capture the 3D mesh or by using a separate computing device. The second annotations may be marked using similar tools as used on the same recording device. The second annotations may also be marked using similar tools on the separate computing device, e.g., a desktop computer with a monitor a mouse or on a tablet with finger gestures, as described below in relation to FIG. 4. These marked second annotations can be stored with the 3D mesh of the scene.

The stored 3D mesh or world map may be precisely aligned to the real world such that holographic content may be realistically projected in the user's augmented view using an AR headset or a smartphone or tablet screen. One or more users may retrieve the 3D mesh and mark annotations in either online mode (live view) or offline mode (static view) for various objects, which annotations may be stored with the 3D mesh. This can result in a continuous and dynamic updating of the 3D mesh with the annotations, such that the one or more users may mark annotations at the same or a similar time in the 3D mesh and be able to view constantly and dynamically updated projected 2D annotations which correspond to annotations marked by the other users. The one or more users may also capture images of a scene with projected annotations, as described further below. An exemplary environment for facilitating mixing static scene and live annotations for labeled dataset collection is described below in relation to FIG. 1, while an exemplary flow for moving back and forth between online and offline mode is described below in relation to FIG. 2.

Thus, the described embodiments provide an improvement to the collection of labeled training data or a labeled image dataset, by allowing a user to mark annotations for physical objects in a scene as represented by a 3D mesh or an AR world map, while the user is in either an online mode (live view) or an offline mode (static view). Marked annotations made by any user, whether in online or offline mode, can be stored along with the 3D mesh and subsequently projected as 2D annotations when the 3D mesh is retrieved and displayed on another user's recording device or computing device. These improvements can result in a more efficient system for obtaining and collecting labeled training data.

The term "object" or "physical object" can refer to a material item of interest and can include, e.g., parts, devices, equipment, tools, people, animals, body parts, etc.

The term "computing device" can refer to a device or entity which is capable of being connected to a network. The term "recording device" can refer to a computing device which captures images of an object and a scene to create a 3D mesh or world map of the scene. In this disclosure, a computing device and a recording device may include tools which allow a user to mark annotations around, on, for, or associated with a physical object in the scene. An example of such labeling tools and AR features is described below in relation to FIGS. 3A, 3B, and 4.

The term "computing system" can refer to a computing device which is coupled to peripheral input/output (I/O) devices, such as a keyboard, a video monitor or display screen, and a pointing device or mouse.

The term "online mode" can refer to a mode in which a live view of a scene is available, e.g., a user using an AR device or other recording device to view the scene in real time using the device. The term "offline mode" can refer to a mode in which a static view of the scene is available, e.g., a user using an AR device, recording device, or other computing device to view the scene as a saved static scene using the device.

Figure 1B:
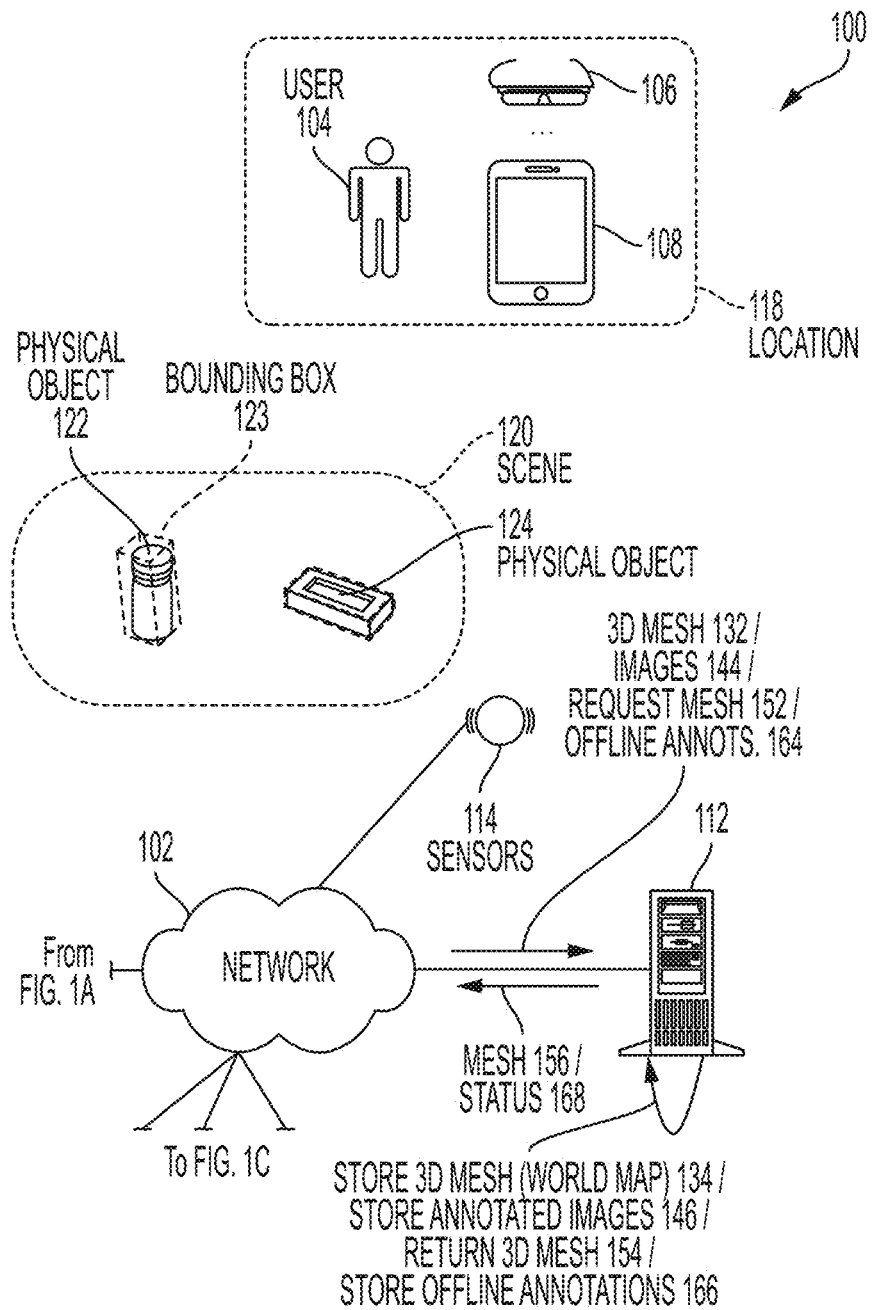
Figure 1C:
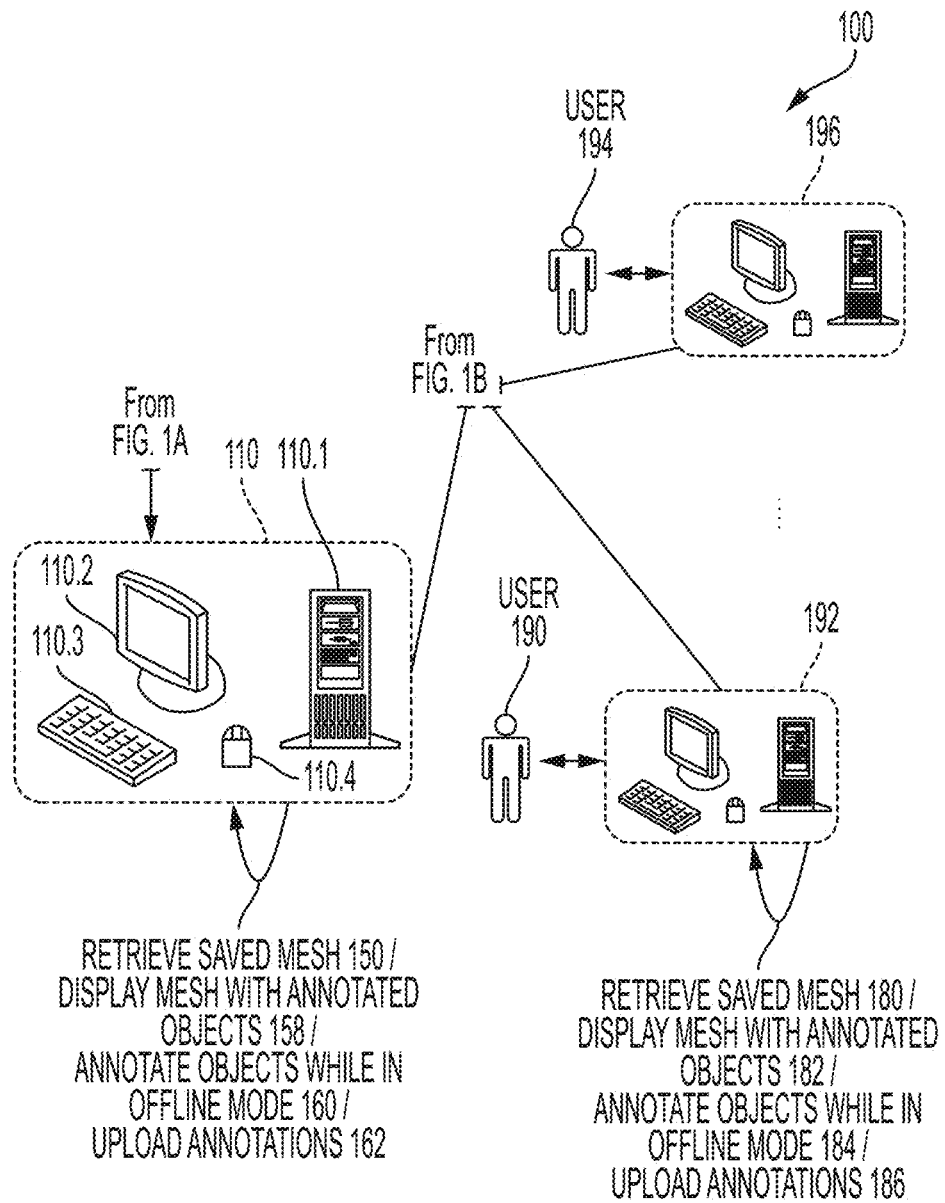

Exemplary Environment and Flow for Mixing Static Scene and Live Annotations for Labeled Dataset Collection FIGS. 1A, 1B, and 1C (collectively referred to herein as "FIG. 1") illustrate an exemplary environment 100 for facilitating mixing static scene and live annotations for labeled dataset collection, in accordance with an embodiment of the present invention. Environment 100 can include: a user 104 associated with a device 106 and a device 108; a device 110 associated with user 104; a device 192 associated with a user 190; a device 196 associated with a user 194; a physical object 122 in a scene 120; a device 112; and sensors 114.

Device 106 can include an augmented reality (AR) device (such as a Microsoft HoloLens). Device 108 can include a computing device with input functionality, such as a tablet or other computing device with a touch screen or other input components. Devices 106 and 108 (or "device 106/108") can be any recording device which can display a 3D mesh as an overlay of a scene in a live view mode, and can further include displayed AR features (such as a bounding box 123 around physical object 122). Scene 120 can have an associated 3D world coordinate frame and can include a plurality of objects, e.g., physical objects 122 and 124.

Device 112 can include a server or other computing device which can receive, transmit, and store data, and can perform algorithms to: align multiple 3D meshes; return a single or aligned 3D mesh; project vertices into images taken from multiple perspectives in the 3D world coordinate frame; and train a model. Devices 110, 192, and 196 can represent a computer system or a computing system and can include peripheral input/output (I/O) devices. For example, computer system 110 can include: a server 110.1; a display 110.2; a keyboard 110.3; and a pointing device 110.4. While certain operations are described below as associated or performed by device 112, those operations may also be performed by any of devices 110, 192, and 196.

Sensors 114 and other tracking sensors (not shown) can work together with device 106/108 in a system to capture images, annotate images, determine 3D coordinates, store annotated images, project images and annotations, display projected images and annotations, and obtain a labeled dataset collection. Devices 106, 108, 110, 192, 196, and 112 and sensors 110 can communicate via a network 102.

During operation, user 104 can use device 106/108 from various locations in scene 120 to capture a 3D mesh of scene 120. A location changes 160 indicator can refer to user 104 using device 106/108 from, e.g., locations 116, 117, and 118. User 104 can capture a 3D mesh of scene 120 (operation 130) and send images and data associated with the 3D mesh to device 112 (as 3D mesh 132). Upon receiving 3D mesh 132, device 112 can store the 3D mesh as a world map (operation 134). Device 112 can return a status 168, which can be displayed on device 106/108 to indicate to the user that the 3D mesh has been successfully uploaded (not shown).

User 104 can confirm or set the mode of device 106/108 to an online mode (operation 136), move to a particular location of live view of the 3D mesh (e.g., location 117), and freeze the mesh (operation 138). User 104, using device 106/108, can mark first annotations for physical object 122 as displayed in the 3D mesh, including capturing the image with the marked first annotations (operation 140). The annotations can include, e.g., drawing or selecting vertices and creating 3D bounding boxes or areas using tools which take advantage of AR features of device 106/108. An example of a display in an online mode during a live view is described below in relation to FIGS. 3A and 3B.

User 104 can perform this annotation operation in the online mode from a single location or multiple locations. Device 106/108 can upload the image(s) and annotations to device 112 (operation 142), which can be sent as images 144 to device 112. Upon receiving images 144, device 112 can store the annotated images (operation 146) and return status 168, which can be displayed on device 106/108 to indicate that the annotated images have been successfully stored (not shown).

User 104 can confirm or set the mode of device 106/108 to an offline mode (operation 148) and move to the location of device 110. User 104 can use device 110 to retrieve and load the previously stored 3D mesh (operation 150). Device 110 can send a request for the mesh 152 to device 112. Upon receiving the request 152, device 112 can return the requested 3D mesh (operation 154) as mesh 156. Mesh 156 can include all previously marked and uploaded/saved annotations, which may be projected as corresponding 2D annotations in the 3D mesh. Upon receiving mesh 156, device 110 can display the mesh with the annotated objects (operation 158). An example of a display in an offline mode or a static scene, including projected 2D annotations corresponding to the previously annotated objects (e.g., 3D bounding boxes created during the online mode), is described below in relation to FIG. 4.

While in the offline mode, user 104 can annotate objects displayed in the 3D mesh (operation 160), e.g., an object which has already been annotated but may require additional annotations or another object which has not yet been annotated. Device 110 can upload the annotations to device 112 (operation 162), which can be sent as offline annotations 164 to device 112. Upon receiving offline notations 164, device 112 can store the offline notations along with or as a part of the 3D mesh (operation 166). The offline annotations may be second annotations which are placed similar to the marked first annotations, i.e., drawing or selecting vertices and creating 3D bounding boxes or areas. Device 112 can return status 168, which can be displayed on device 110 to indicate to the user that the offline notations have been successfully uploaded. While environment 100 depicts user 104 using device 110 to mark the offline annotations, user 104 may also mark the offline annotations using device 106/108 or the same recording device used to capture the 3D mesh).

In some embodiments, other users with access to the saved 3D mesh (e.g., users 190 and 194) can also perform offline annotation on the objects in the scene using their respective device (e.g., devices 192 and 196). As an example, user 190 can confirm or set the mode of device 192 to an offline mode and retrieve the saved mesh (operation 180 and steps previously described corresponding to operations 152-156). Device 192 can display the mesh with the annotated objects (operation 182). The annotations can include projected 2D annotations corresponding to the annotations marked by user 104 (or any other user) while in an online or an offline mode. The other users may also place online annotations for the objects in the scene using their own recording or AR devices (not shown). Thus, uploading and updating of the annotated objects in the 3D mesh by multiple users via multiple devices may occur automatically and continuously, which can result in a dynamic and constantly updated 3D mesh with annotated objects (i.e., projected 2D annotations) in either mode by multiple users at the same time.

While in the offline mode, user 190 can annotate objects displayed in the 3D mesh (operation 184), e.g., an object which has already been annotated but may require additional annotations or another object which has not yet been annotated. Device 192 can upload the annotations to device 112 (operation 186), which can be sent and saved as described above for annotations 164, operation 166, and status 168.

In some embodiments, multiple users may create a plurality of 3D meshes for a same scene. Device 112 can align multiple 3D meshes (e.g., by using a method to align 3D point clouds) and return an aligned 3D mesh associated with a given scene. The multiple users may also request a particular 3D mesh associated with the given scene and annotate that version of the 3D mesh. Device 112 can subsequently align the multiple 3D meshes with their respective annotations to obtain a single 3D mesh with aligned or merged annotations from all users (whether obtained during the online mode of live view or the offline mode of static scene).

Thus, the described embodiments allow multiple users to efficiently label physical objects in a given 3D world scene using their respective devices, either in a live view mode (online) or in a static scene mode (offline). The users may switch back and forth between the online and the offline modes, depending on the task at hand, as described below in relation to FIG. 2.

Marking Annotations in One or Two Modes and Switching Between Modes

Figure 2:
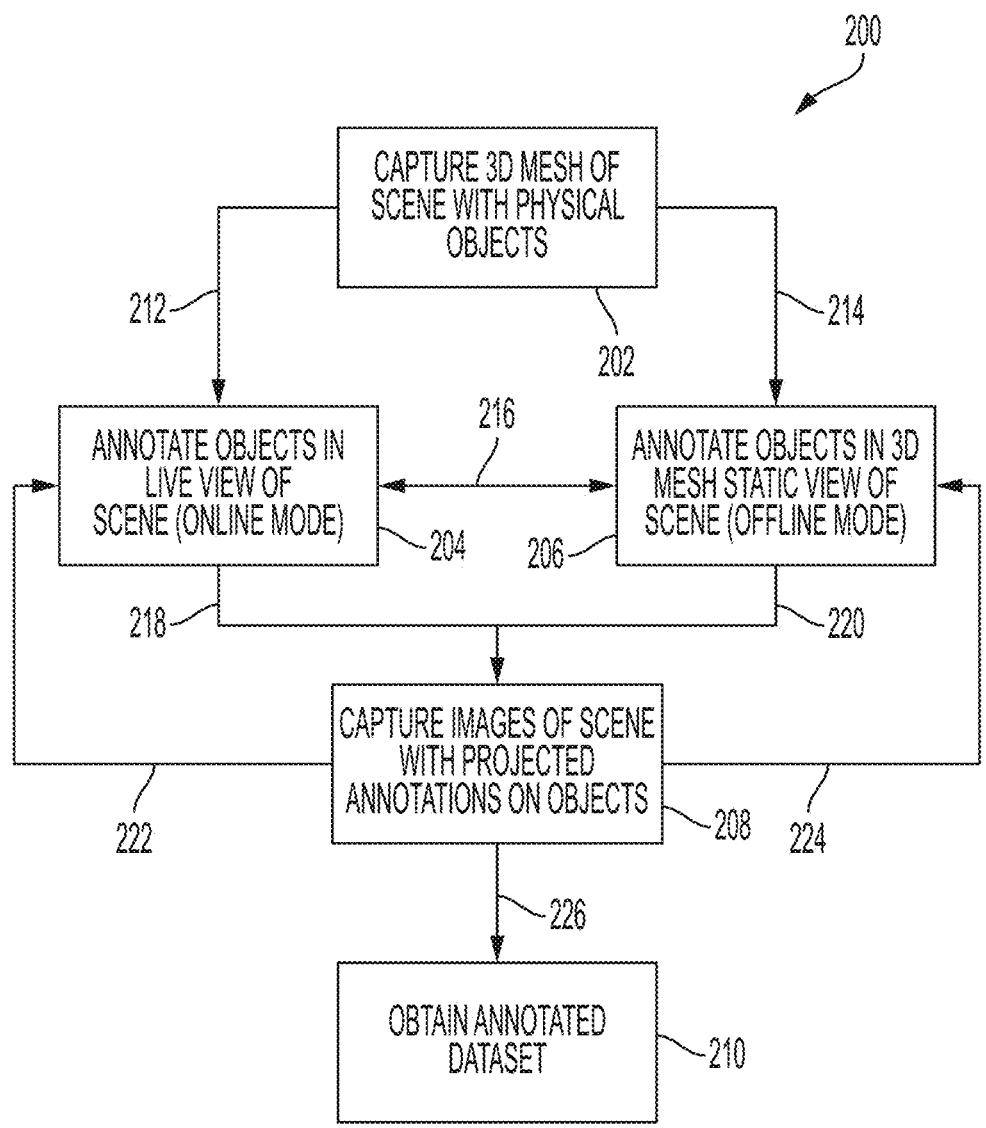
FIG. 2 presents a diagram illustrating a flow between two modes for marking annotations for physical objects in a scene, in accordance with an embodiment of the present application.

FIG. 2 presents a diagram 200 illustrating a flow between two modes for marking annotations for physical objects in a scene, in accordance with an embodiment of the present application. While the actions represented in the modules of diagram 200 are described in relation to a single user, diagram 200 can also represent the actions of multiple users. During operation, a user can capture a 3D mesh of a scene with physical objects (module 202, similar to operation 130 of FIG. 1). The user can perform either or both of the actions in modules 204 and 206.

The user can annotate objects in a live view of the scene (online mode), via a path 212 (module 204, similar to operation 140 of FIG. 1) on a device. The user can place the annotations for an object using a set of tools on the device. The tools can indicate information about the physical object, including: a name or class of the object (e.g., "Tea Kettle"); a state of the object (e.g., "Open," "Closed," or "Neutral"); and a location of the object (e.g., by drawing a 3D bounding box around the object using AR features of the device). Exemplary annotation tools are described in U.S. Pat. Nos. 10,699,165 and 11,200,457 and can include: drawing a 2D or 3D bounding box or area around the object; drawing a free-hand polygon around the object using a manual "paint" or "draw" feature; using a virtual paint tool which allows the user to color the object; and placing multiple vertices along the boundaries of the object to define a bounding area for the object.

At any time, the user may switch from the online mode to the offline mode (as indicated by a path 216), and all annotations placed up to that point in time can transfer to the other mode. That is, all marked annotations which have been successfully uploaded and saved as part of the 3D mesh for the scene can be accessed and visible as projected 2D annotations when retrieving the saved 3D mesh when switching to the offline mode (as described above in relation to FIG. 1).

The user can also annotate objects in a static view or the scene (offline mode), via a path 214 (module 206, similar to operations 160 and 184 of FIG. 1) and place annotations in similar manner as described above in the online mode (e.g., using tools which indicate information about the physical object). To move around the displayed 3D mesh and place the annotations while in the offline mode, the user can use a variety of input devices. For example, the user can use a mouse and keyboard, a special finger gesture on a table screen, or some other input device. To place the annotations, the user may use the same recording device used to capture the 3D mesh or mark the online annotations. The user may also use a different computing device (such as a laptop or desktop computing system) to place the annotations in the offline mode. The user may also upload the 3D mesh with the offline annotations to the cloud (or a computing device accessible by another user or computing device), and a different user may place annotations on the same 3D mesh, e.g., using a different device or via a web browser (as described above in relation to user 190 and device 192 of FIG. 1).

As described above for module 204, at any time, the user may switch from the offline mode to the online mode (as indicated by path 216), and all annotations placed up to that point in time can transfer to the other mode. That is, all marked annotations which have been successfully uploaded and saved as part of the 3D mesh for the scene can be accessed and visible as projected 2D annotations when retrieving the saved 3D mesh when switching to the online mode (as described above in relation to FIG. 1).

After placing the annotations (whether in online mode as in module 204 or in offline mode as in module 206), the user can walk around the scene and capture images of the scene with projected annotations on the objects (e.g., with aligned annotations), via paths 218 and 220 (module 208). Each marked annotation can be projected as 2D annotations in the image view of the object, as described in U.S. Pat. Nos. 10,699,165 and 11,200,457. In some embodiments, the system may provide or display interactive and dynamic instructions to the user to capture additional images of the scene or an object from a particular location or angle or under a particular lighting condition. In other embodiments, the system may provide live coverage analysis and error analysis based on dynamically changing colors mapped to faces of a geodesic polyhedron surrounding the object in a given image. Interactive feedback (including instructions, live coverage analysis, and error analysis) is described in U.S. patent application Ser. No. 17/840,358.

When capturing the additional images (and any images) of the scene for the 3D mesh using the recording device, the system may also collect and store data associated with the physical objects, including but not limited to: a 3D real-world location of a respective physical object; a projected view of the respective physical object; a class or description of the respective physical object; a state associated with the respective physical object; and metadata associated with an image of the respective physical object.

The user can also edit any annotations which are displayed in the 3D mesh or add annotations to objects displayed in the 3D mesh, in either the online mode or the offline mode, via paths 222 and 224 (returning, respectively, to modules 204 and 206). Any new annotations may or may not be propagated to previously captured and stored images.

Subsequent to placing the desired annotations (whether in online or offline mode), and in some embodiments, subsequent to reaching a threshold for diversity of images collected for a training dataset (as described in U.S. patent application Ser. No. 17/840,358), the user can obtain the annotated dataset (module 210), via a path 226. The user or a system can use this annotated dataset to train a model, as well as for future object detecting using a trained model, as described in U.S. patent application Ser. No. 17/840,358, U.S. Pat. Nos. 10,699,165 and 11,200,457.

Exemplary Operation and Display During Online Mode

Figure 3A:
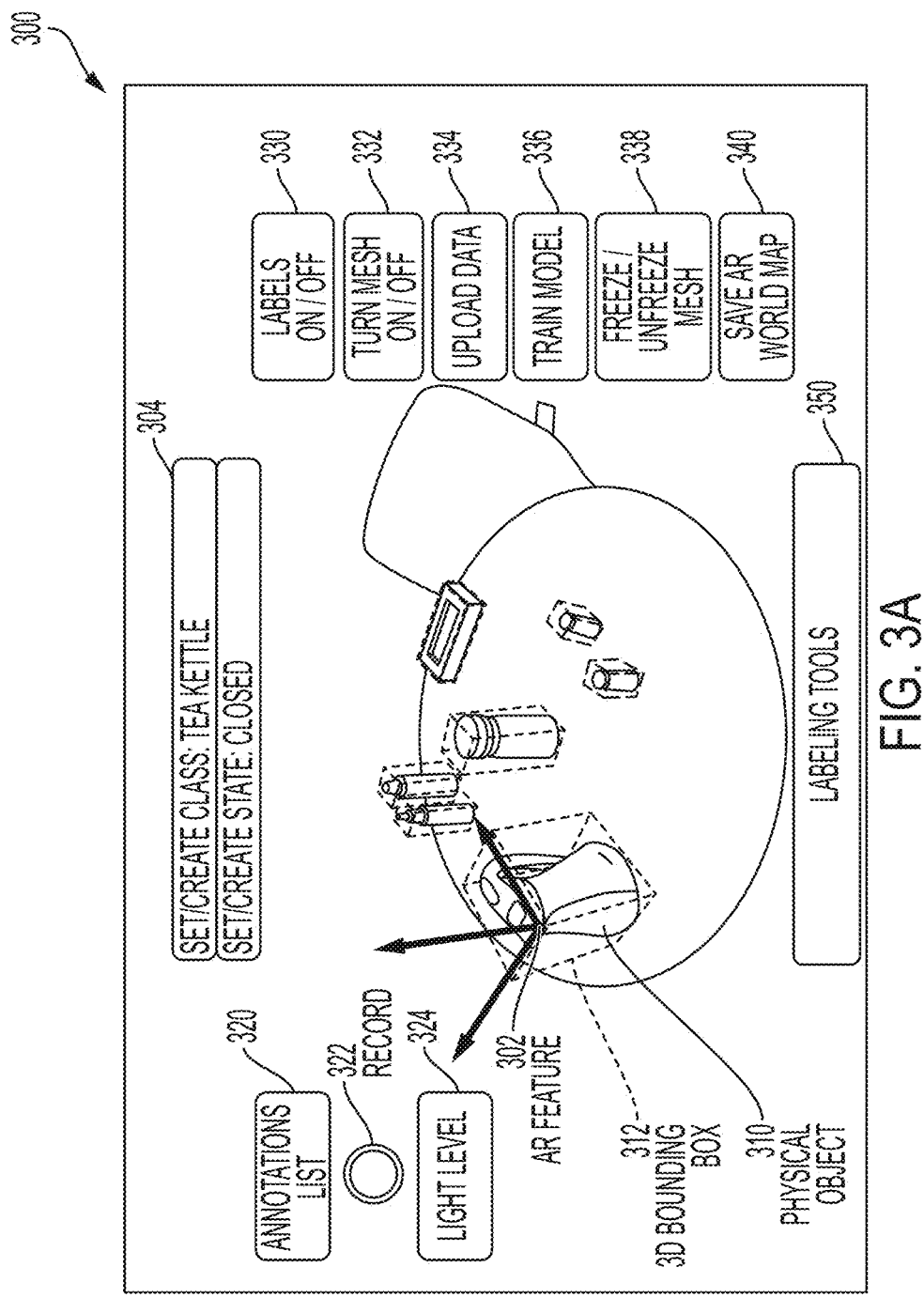
FIG. 3A illustrates a scene as viewed via a display of an AR device in an online mode, including marked annotations placed over several objects indicating their location in the scene, in accordance with an embodiment of the present invention.

FIG. 3A illustrates a scene as viewed via a display 300 of an AR device in an online mode, including marked annotations placed over several objects indicating their location in the scene, in accordance with an embodiment of the present invention. Display 300 can include a scene with physical objects, including a physical object 310 (e.g., a tea kettle). Display 300 can include labeling tools 350 or AR tools or features. For example, an AR tool or feature 302 can indicate how to create a bounding box, e.g., by using natural 3D handles controlled by figure gestures such as translate, rotate, and scale or by dragging certain arrows corresponding to the each of the 3D axis (xyz) in a particular direction to change a size of the bounding box. Some annotation tools allow the user to place vertices along the boundaries of objects which can be used to define the bounding area associated with the object. When object has been bounded or "localized," the user can use an AR tool or feature 304 to provide a label description of the object (e.g., "Tea Kettle," "Salt Shaker," "Pepper Shaker," "Creamer," etc.) as well as a state (e.g., "Neutral," "Off," "On," "Open," "Closed," etc.).

Thus, the user can use the labeling tools or AR features to mark annotations for a physical object, e.g., using AR feature 302 to draw a 3D bounding box 312 around physical object 310 and using AR feature 304 to set the class and state for object 310. The user-defined annotations may be included as part of the metadata captured by the recording device.

Display 300 can also include several settings, actions, commands, or controls which can be activated or de-activated by the user, e.g.: a labels on/off control 330; a turn mesh on/off control 332; an upload data control 334; a train model control 336; a freeze/unfreeze mesh 338; and a save AR world map control 340. The user may freeze the mesh in order to annotate an object and upload the corresponding image. The user may unfreeze the mesh when they are ready to move to a different view of the scene in the 3D world map.

Display 300 can also include: an annotations list 320 which can display all annotations placed in the mesh in a list or other format; a record widget 332 which when activated can capture one or more images (while the mesh is frozen or unfrozen); and a light level indicator 324 which can display a number corresponding to an amount of light visible or detected by the recording device in real time.

Figure 3B:
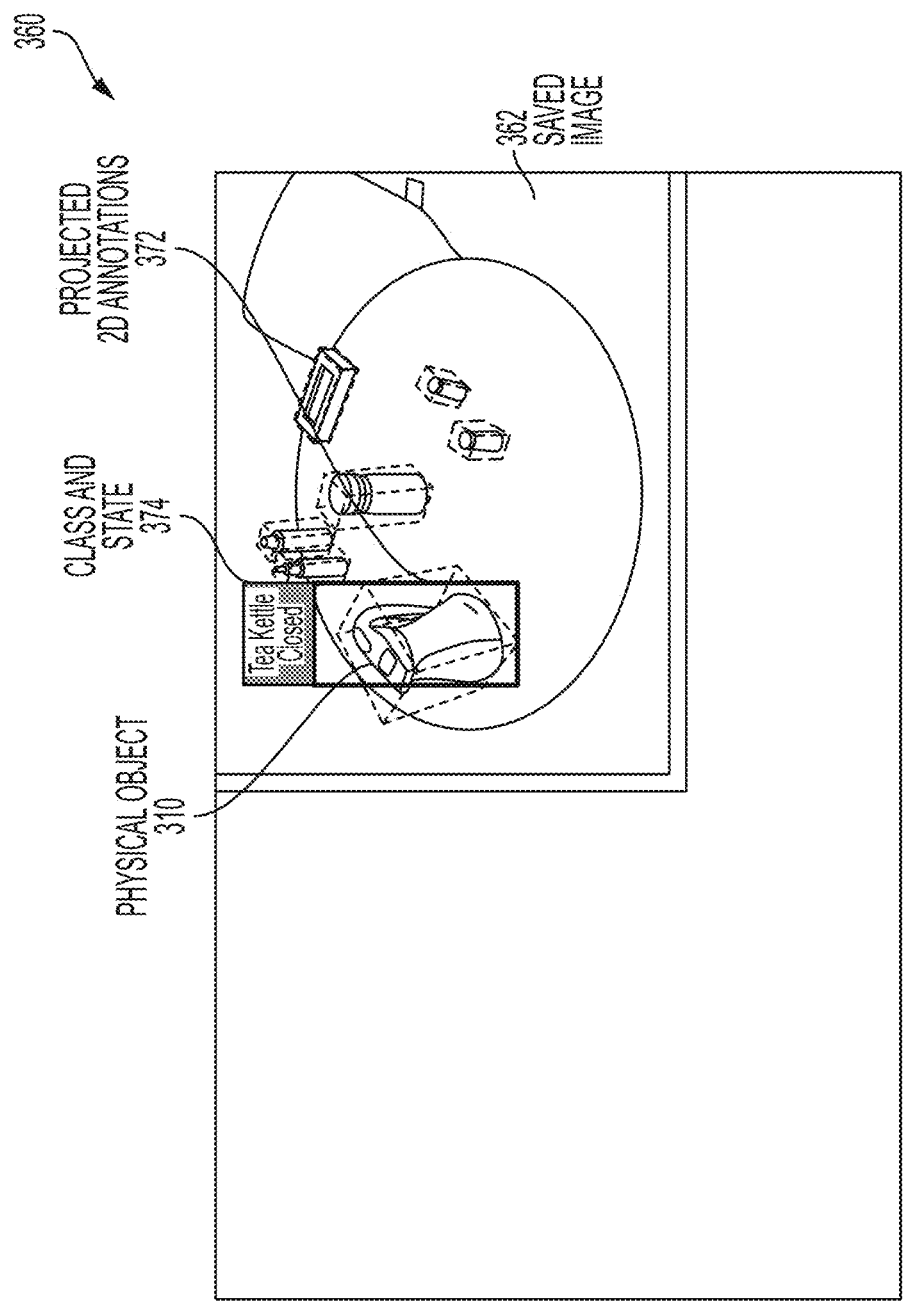
FIG. 3B illustrates a scene as viewed via a display of an AR device in an online mode, including a saved image with projected 2D annotations corresponding to the marked annotations in FIG. 3A, in accordance with an embodiment of the present invention.

FIG. 3B illustrates a scene as viewed via a display 360 of an AR device in an online mode, including a saved image 362 with projected 2D annotations 372 corresponding to the marked annotations (indicated by 3D bounding box 312) in FIG. 3A, in accordance with an embodiment of the present invention. Saved image 362 can be displayed as an overlay on a portion of display 360, e.g., in the upper right hand corner, and can indicate to the user the correlation, correspondence, or association between the marked annotations placed by the user using the AR features or tools and the projected 2D annotations as determined by the system. Saved image 362 can also include a class and state 374 of physical object 310, which was previously set by the user in display 300, respectively, as "Tea Kettle" and "Closed." Display 360 can display saved image 362 as an overlay on a display similar to display 300 of FIG. 3A (indicated as a blank space in FIG. 3B).

Exemplary Operation and Display During Offline Mode

Figure 4:
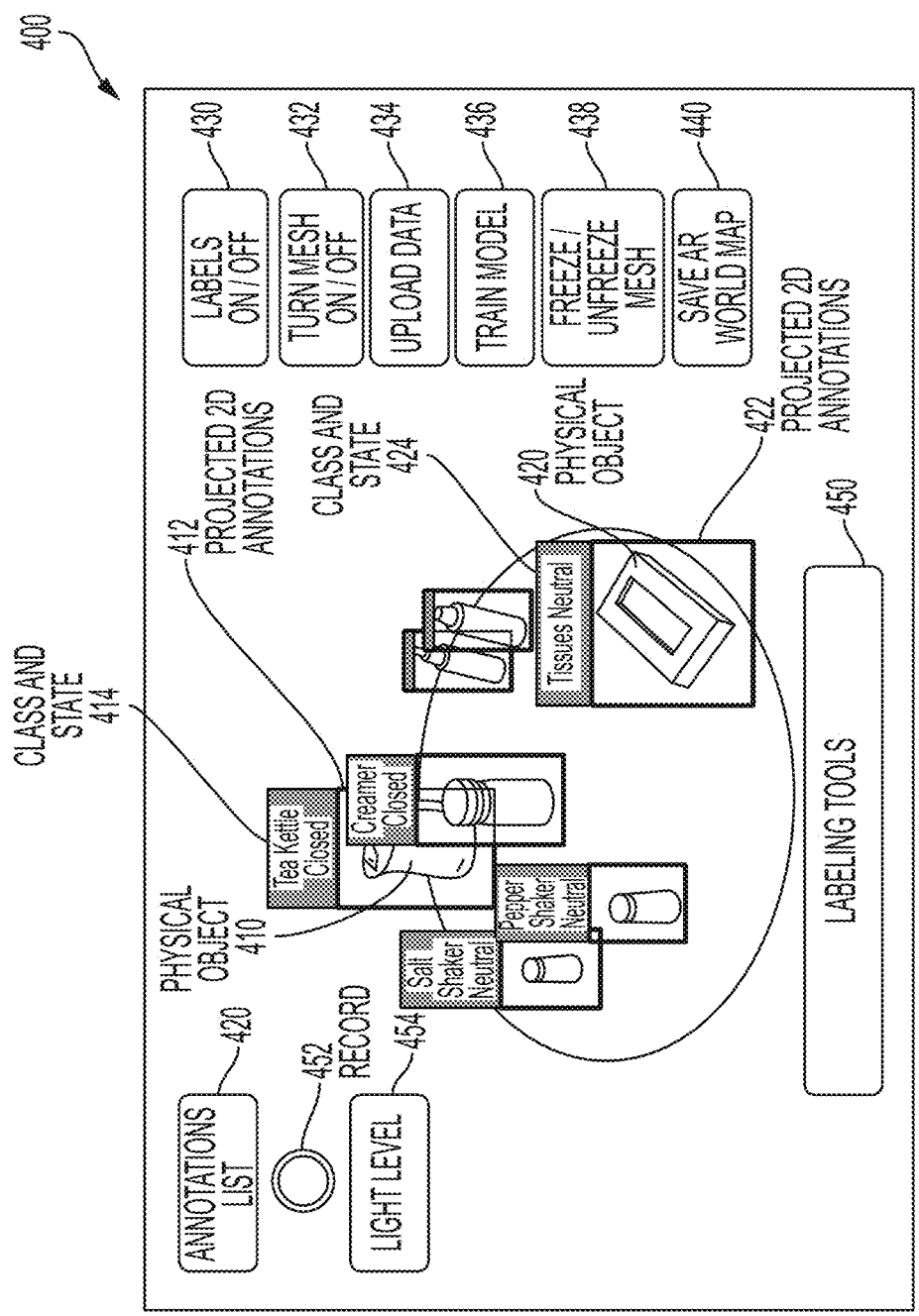
FIG. 4 illustrates a scene as viewed via a display of an AR device or a computing device in an offline mode, including projected 2D annotations corresponding to previously marked annotations, in accordance with an embodiment of the present invention.

FIG. 4 illustrates a scene as viewed via a display 400 of an AR device or a computing device in an offline mode, including projected 2D annotations corresponding to previously marked annotations, in accordance with an embodiment of the present invention. Similar to display 300, display 400 can include labeling tools 450, which allow a user to use an AR tool or feature to draw a 2D or 3D bounding box or other markings around a physical object (not shown). Also similar to display 300, display 400 can include settings, actions, commands, or controls which can be activated or de-activated by the user, e.g.: a labels on/off control 430; a turn mesh on/off control 432; an upload data control 434; a train model control 436; a freeze/unfreeze mesh 438; and a save AR world map control 440. Display 400 can also include: an annotations list 420 which can display all annotations placed in the mesh in a list or other format; a record widget 432; and a light level indicator 324 which can display a number corresponding to an amount of light visible or detected by the recording device at the time the image shown in display 400 was taken.

Display 400 can include the projected 2D annotations corresponding to previously marked annotations. For example, a physical object 410 is indicated with projected 2D annotations 412 (e.g., a 2D bounding box) and a class and state 414 of "Tea Kettle" and "Closed." A physical object 420 is indicated with projected 2D annotations 422 (e.g., a 2D bounding box) and a class and state 424 of "Tissues" and "Neutral."

The projected annotations of FIGS. 3B and 4 and the instant embodiments can be based on recording the coordinates of bounding boxes in the common 3D world frame, which allows the system to know where the bounding boxes appear relative to the recording device at all times. Because the 3D mesh is saved along with marked annotations during any and all collection sessions (whether in online or offline mode), the user can accumulate data from multiple runs or passes. As described above, the user can explicitly provide a label description and a state of an object while annotating an object. The user can also explicitly provide other metadata, such as a lighting condition, occlusion information, and blur information, or that metadata may be captured or provided by the recording device.

Figure 5A:
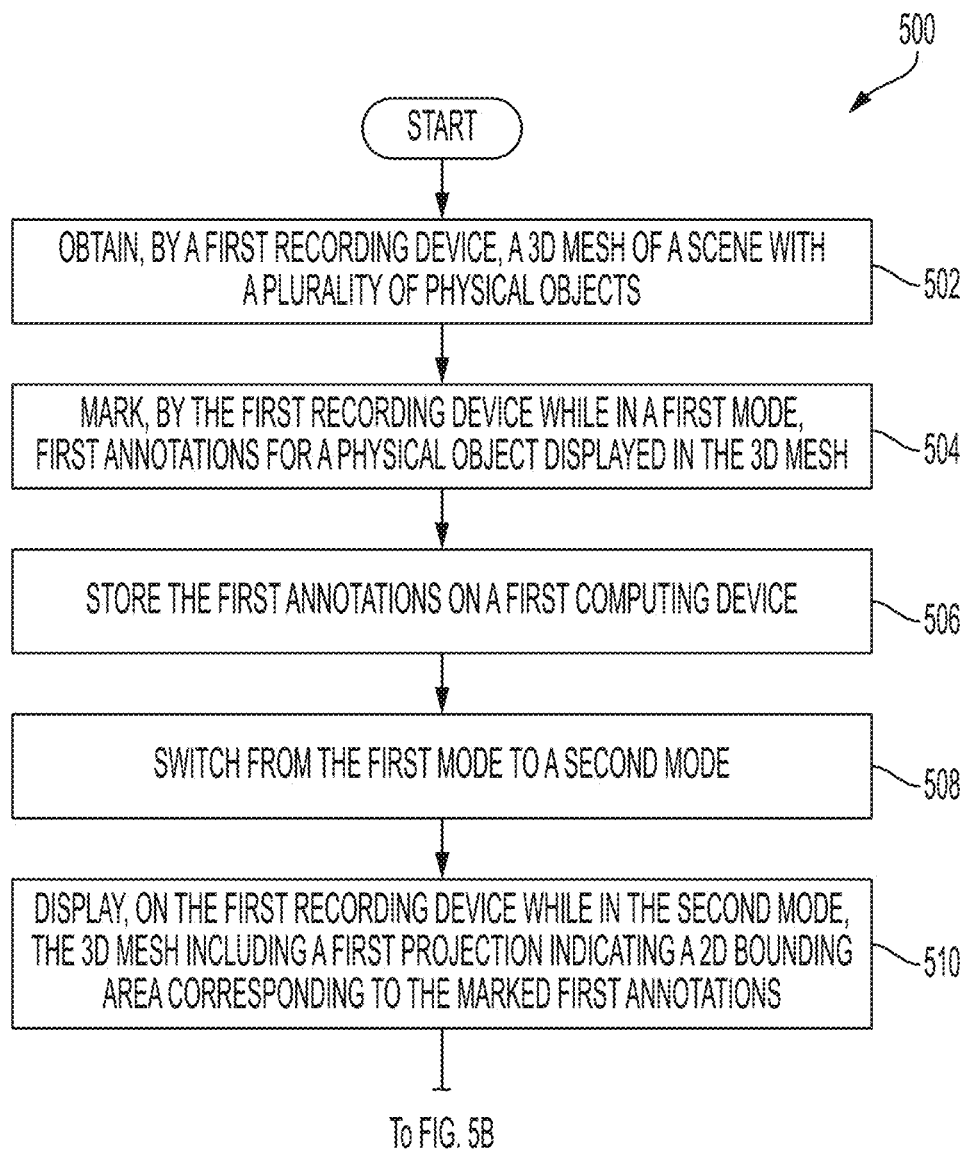
FIGS. 5A and 5B illustrate a flowchart illustrating a method for mixing static scene and live annotations for labeled dataset collection, in accordance with an embodiment of the present invention.
Figure 5B:
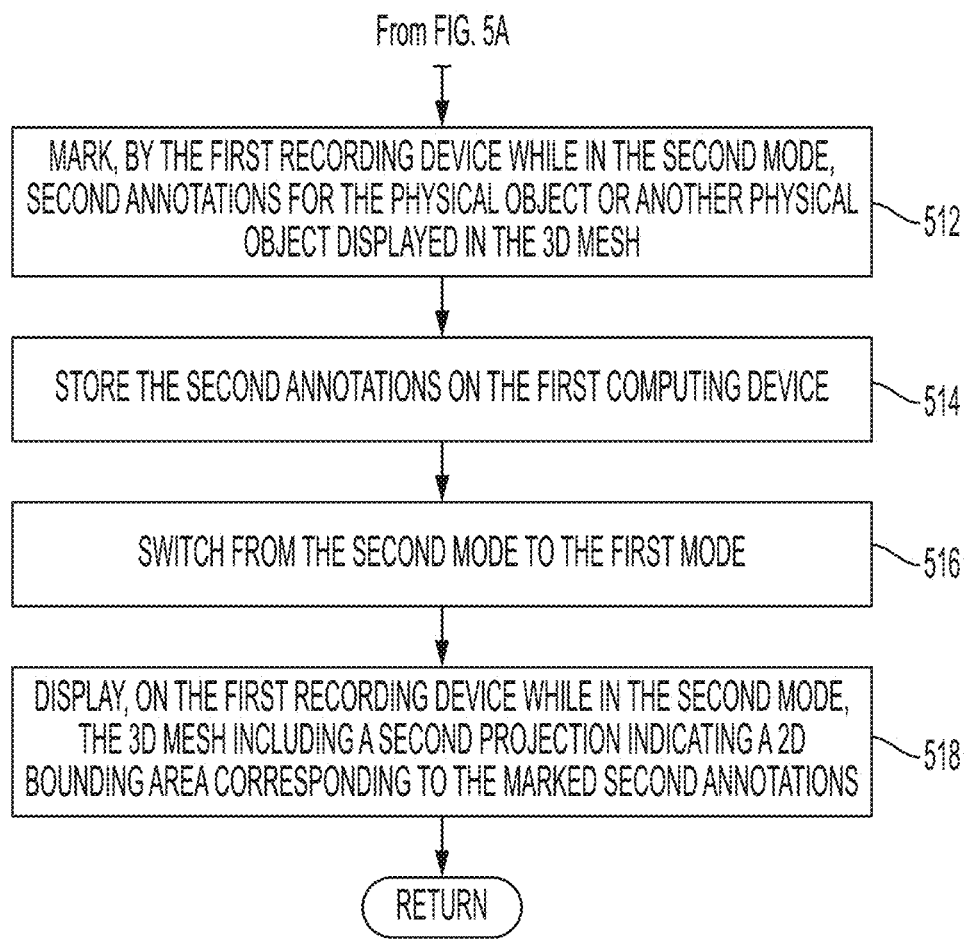

Method for Mixing Static Scene and Live Annotations for Labeled Dataset Collection FIGS. 5A and 5B (collectively referred to herein as FIG. 5) illustrate a flowchart 500 illustrating a method performed by a system for mixing static scene and live annotations for labeled dataset collection, in accordance with an embodiment of the present invention. During operation, the system obtains, by a first recording device, a three-dimensional (3D) mesh of a scene with a plurality of physical objects (operation 502). The system marks, by the first recording device while in a first mode, first annotations for a physical object displayed in the 3D mesh (operation 504). The system stores the first annotations on a first computing device (operation 506). The system switches from the first mode to a second mode (operation 508).

The system displays, on the first recording device while in the second mode, the 3D mesh including a first projection indicating a two-dimensional (2D) bounding area corresponding to the marked first annotations (operation 510). The system marks, by the first recording device while in the second mode, second annotations for the physical object or another physical object displayed in the 3D mesh (operation 512). The system stores the second annotations on the first computing device (operation 514). The system switches from the second mode to the first mode (operation 516). The system displays, on the first recording device while in the first mode, the 3D mesh including a second projection indicating a 2D bounding area corresponding to the marked second annotations (operation 518). The operation returns.

While flowchart 500 of FIG. 5 depicts the various operations by a single user in a particular order, the described embodiments can include one or more users switching between online and offline mode to retrieve and update (e.g., to edit or mark new annotations) the 3D mesh including all previously marked annotations, which can be projected as 2D annotations upon retrieval and display of the 3D mesh.

Thus, the embodiments described herein provide a system which increases the efficiency of collecting training data for machine learning (e.g., computer vision systems) by providing a seamless mechanism for multiple users to annotate objects in a shared 3D mesh or AR world map (e.g., switching between live view and static scene modes). The increased efficiency can include a significant reduction in the amount of manual labeling required to annotate images, including multiple regions or objects of interest in the images, which can result in an improvement in the technological field of machine learning and computer vision systems.

Improvements to Existing Technologies

Some common forms of augmented reality (AR) in the service industry include a tethered telepresence, a visual retrieval of information, and a repair script with overlays. However, each of these results is hindered by inefficiencies. In a tethered telepresence, a remote technician may need to perform a visual inspection, which can require both connectivity and extensive human expert time. In a visual retrieval of information (e.g., the Digital Glove Box application), a camera may retrieve a model number, manual pages, or telemetry statistics. However, the output is a passive page and may be limited to a single room. In a repair script with overlays, a checklist or procedural prompt may be overlaid on a user's view, and the user can click through the overlaid view. However, the view may be expensive to create and is still mostly passive, in that the view is not able to understand the user's actions. Thus, producing stand-alone AR content currently requires extensive work (e.g., by artists, human experts, and machine learning experts) to create images and video (e.g., animation) to train a model, which can result in an inefficient system.

The embodiments described herein provide a system which increases the efficiency of collecting training data for machine learning by providing an AR-based mechanism for multiple users to annotate objects in a shared 3D mesh or AR world map (e.g., switching between live view and static scene modes). In addition to decreasing the amount of human time and labor required to collect training data, the system can also decrease the development time of new object detection systems. Beyond bounding box coordinates, the ground truth annotation can also capture 3D information about the object location, orientation, and pose from the recording device. The collected data can thus be used for a wider set of computer vision problems, e.g., estimation of pose, depth, size, object class, and properties such as "rough" vs. "smooth."

Furthermore, embodiments of the system can quickly create large labeled datasets of parts of systems managed by customers and use the labeled datasets to train computer vision systems. A trained system can assist service technicians with management and repair of a part of a system and can also allow a customer to assist an end-user with repair of a system part. A differentiator between these existing tools and the proposed technology is the large amount of time needed to collect the training data for the computer vision systems encased within the existing tools. This large amount of time can be reduced to a tiny fraction (e.g., 1/10 or less) by using the embodiments of the system to efficiently collect training data using the described mechanism.

Other exemplary systems managed by customers can include: cars or vehicles (where the dashboard or other car part, e.g., an engine or a feature in the cabin of the car, may be a region of interest for which the customer may require assistance); and printers or other devices (where a feeder tray, output tray, control panel, or other part may be the region of interest). A customer (or an end-user) who may require assistance can take a photo of the system with his cell phone, and obtain useful information about a certain "labeled" section of the photo. For example, if a user of a vehicle experiences an issue with the vehicle, the vehicle user can capture an image of the vehicle dashboard with his mobile device, and, based on the previously generated diverse set of labeled images of the dashboard from various camera poses, the vehicle user can obtain a labeled image that may be used to assist the user in understanding how to address the issue.

Thus, by providing a system which allows multiple users to continuously and dynamically label objects, update labels/annotations, and view marked annotations, while switching back and forth as needed between the live view and the static scene mode on various devices, the described embodiments facilitate a method and system which improve the efficient collection of a labeled image dataset for machine learned computer vision tasks. This can result in a significant reduction in the burden of labeling for training an effective computer vision system.

Exemplary Computer and Communication System

Figure 6:
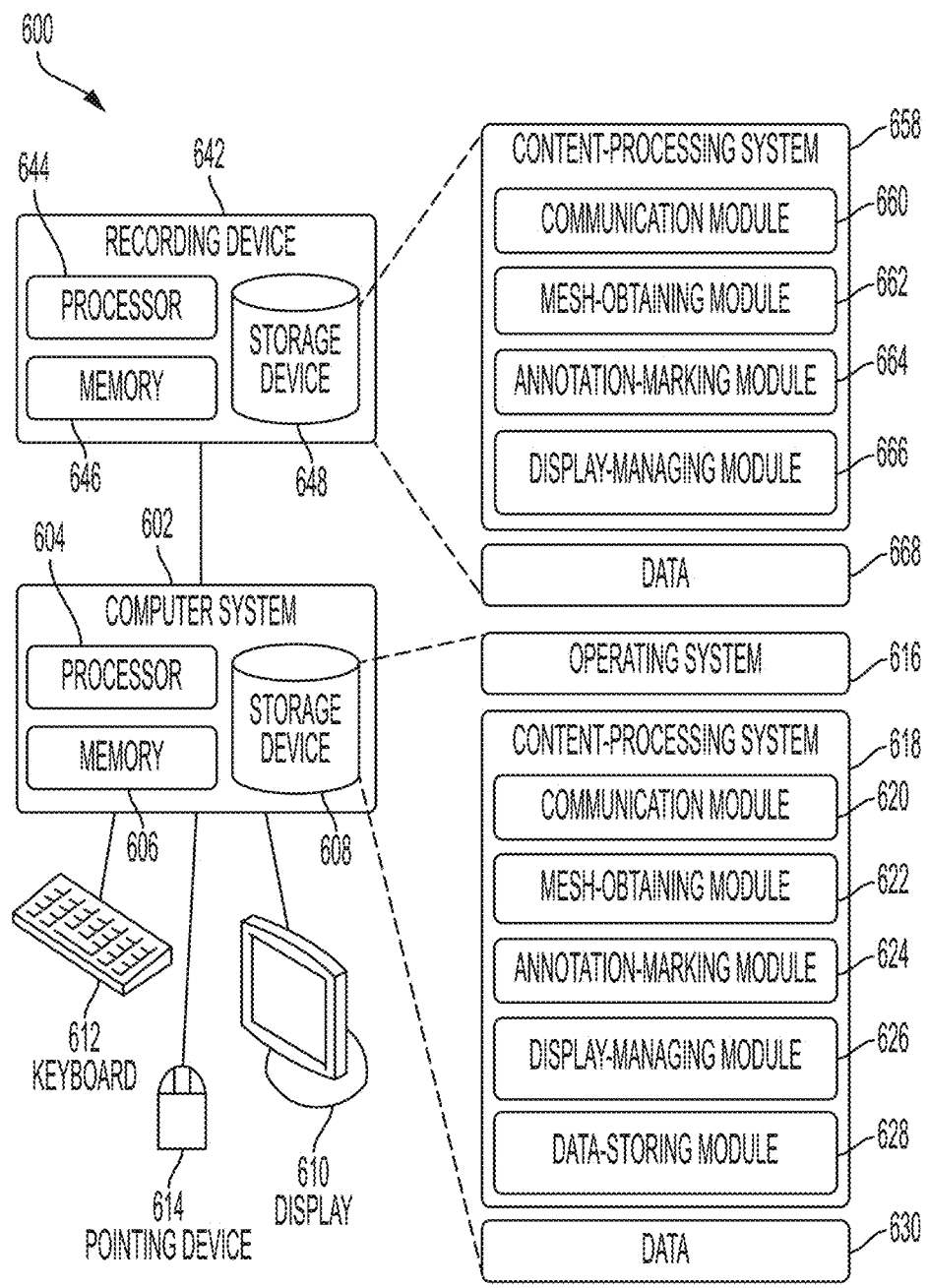
FIG. 6 illustrates an exemplary computer and communication system that facilitates mixing static scene and live annotations for labeled dataset collection, in accordance with an embodiment of the present invention.

FIG. 6 illustrates an exemplary computer and communication system 600 that facilitates mixing static scene and live annotations for labeled dataset collection, in accordance with an embodiment of the present invention. System 600 includes a computer system 602 and a recording device 642, which can communicate via a network (not shown). Computer system 602 can correspond to devices 110, 112, 192, and 196 of FIG. 1. Recording device 642 can correspond to devices 106 and 108 of FIG. 1.

Recording device 642 can include a processor 644, a memory 646, and a storage device 648. Memory 646 can include a volatile memory (e.g., RAM) that serves as a managed memory and can be used to store one or more memory pools. Storage device 648 can store a content-processing system 658 and data 668.

Content-processing system 658 can include instructions, which when executed by recording device 642, can cause recording device 642 to perform methods and/or processes described in this disclosure. Specifically, content-processing system 658 may include instructions for sending and/or receiving/obtaining data packets to/from other network nodes across a computer network (communication module 660). A data packet can include an image, a video, a 3D mesh, data corresponding to annotations, 3D coordinates of a vertex, information about a scene or a physical object in the scene, a command, and instructions.

Content-processing system 658 can additionally include instructions for obtaining, by a first recording device, a 3D mesh of a scene with a plurality of physical objects (mesh-obtaining module 662). Content-processing system 658 can include instructions for marking, by the first recording device while in a first mode, first annotations for a physical object displayed in the 3D mesh (annotation-marking module 664). Content-processing system 658 can include instructions for switching from the first mode to a second mode (display-managing module 666). Content-processing system 658 can also include instructions for displaying, on the first recording device while in the second mode, the 3D mesh including a first projection indicating a 2D bounding area corresponding to the marked first annotations (display-managing module 666). Content-processing system 658 can include instructions for marking, by the first recording device while in the second mode, second annotations for the physical object or another physical object displayed in the 3D mesh (annotation-marking module 664). Content-processing system 658 can include instructions for switching from the second mode to the first mode (display-managing module 666). Content-processing system 658 can further include instructions for displaying, on the first recording device while in the first mode, the 3D mesh including a second projection indicating a 2D bounding area corresponding to the marked second annotations (display-managing module 666).

Content-processing system 658 can additionally include instructions for editing, while in the first mode or the second mode, the first or second annotations for the physical object (annotation-marking module 664). Content-processing system 658 can include instructions for capturing, while in the online mode, additional images of the scene based on instructions provided to the first user and displayed on the first recording device (communication module 660 and display-managing module 666).

Computer system 602 can include a processor 604, a memory 606, and a storage device 608. Memory 606 can include a volatile memory (e.g., RAM) that serves as a managed memory and can be used to store one or more memory pools. Furthermore, computer system 602 can be coupled to a display device 610, a keyboard 612, and a pointing device 614 (similar to elements 110.2-4 of FIG. 1). Storage device 608 can store an operating system 616, a content-processing system 618, and data 630.

Content-processing system 618 can include instructions, which when executed by computer system 602, can cause computer system 602 to perform methods and/or processes described in this disclosure. Specifically, content-processing system 618 may include instructions for sending and/or receiving/obtaining data packets to/from other network nodes across a computer network (communication module 620), such as the data packets described above in relation to communication module 660.

Content-processing system 618 can further include instructions for storing the 3D mesh, the marked first annotations, and the marked second annotations (data-storing module 628). Content-processing system 618 can include instructions for retrieving the 3D mesh including annotations marked in the online and offline mode (mesh-obtaining module 622). Content-processing system 618 can include instructions for obtaining the 3D mesh of the scene (mesh-obtaining module 622). Content-processing system 618 can also include instructions for displaying, while in the second mode, the 3D mesh including a first projection indicating a 2D bounding area corresponding to the marked first annotations (display-managing module 626). Content-processing system 618 can include instructions for marking, while in the second mode, second annotations for the physical object or another physical object displayed in the 3D mesh (annotation-marking module 624).

Content-processing system 618 can additionally include instructions for editing, while in the second mode, the first or second annotations for the physical object (annotation-marking module 624). Content-processing system 618 can include instructions for storing data associated with the plurality of physical objects (data-storing module 628).

Data 630 and 668 can include any data that is required as input or that is generated as output by the methods and/or processes described in this disclosure. Specifically, data 630 and 668 can include at least: data; collected data; an image; an image of a physical object; a collection of training data; a trained network; an image with user-created annotations; an image with system-created or automatically generated or projected annotations; a 3D mesh; a 3D world coordinate frame; an AR world map; a vertex; 3D coordinates for a vertex; a scene; a characteristic of the scene; an indicator of a region of interest on a physical object; marked vertices; a projection of the marked vertices; an indicator of a mode, an online mode, or an offline mode; projected 3D annotations; a class and a state associated with an object; an indicator or identifier of a recording device or a computing device; additional images of a scene; a distance and angle between a recording device and a physical object; a lighting condition associated an image; a percentage of occlusion of a physical object in an image; an amount of blur associated with an image; a class or a state of a physical object in an image; a visualization; instructions; a model; an annotation; metadata; user-supplied information; device-determined information; a request; a command; a test set of images; a training set of images; an output of a trained model; an indicator of a data capture tool; and an indicator of whether an object is detected.

Figure 7:
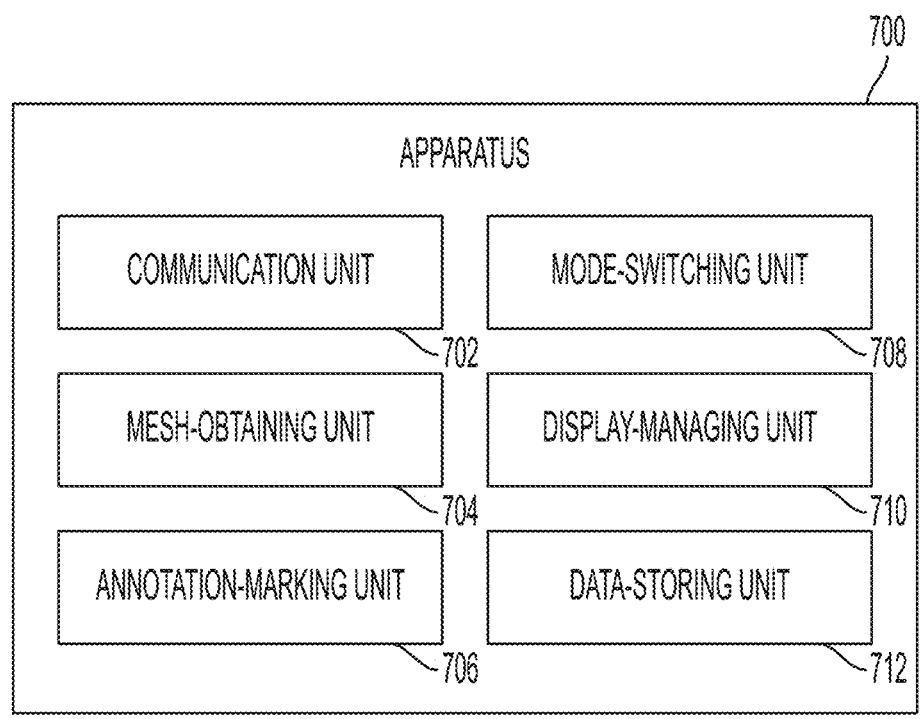
FIG. 7 illustrates an exemplary apparatus that facilitates mixing static scene and live annotations for labeled dataset collection, in accordance with an embodiment of the present application.

FIG. 7 illustrates an exemplary apparatus 700 that facilitates mixing static scene and live annotations for labeled dataset collection, in accordance with an embodiment of the present application. Apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device or devices capable of communicating with other computer systems and/or devices. Specifically, apparatus 700 can comprise units 702-712 which perform functions or operations similar to modules 660-666 of recording device 642 and modules 620-628 of computer system 602 of FIG. 6, including: a communication unit 702; a mesh-obtaining unit 704; an annotation-marking unit 706; a mode-switching unit 708; a display-managing unit 710; and a data-storing unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
obtaining, by a first augmented reality (AR) recording device based on input from one or more sensors, a three-dimensional (3D) mesh of a scene with a plurality of physical objects;
marking, by the first AR recording device while in an online mode, first annotations for a physical object displayed in the 3D mesh,
wherein marking while in the online mode comprises a user associated with the first AR recording device moving around the scene and marking the first annotations in a live view setting by using tools on the first AR recording device;
switching from the online mode to an offline mode by setting a mode on the first AR recording device;
displaying, on the first AR recording device while in the offline mode, the 3D mesh including a first projection indicating a two-dimensional (2D) bounding area corresponding to the marked first annotations;

marking, by the first AR recording device while in the offline mode, second annotations for the physical object or another physical object displayed in the 3D mesh, wherein marking while in the offline mode comprises the user marking the second annotations in a static view setting by using the tools on the first AR recording device or an input device;

switching from the offline mode to the online mode by setting the mode on the first AR recording device;

displaying, on the first AR recording device while in the online mode, the 3D mesh including a second projection indicating a 2D bounding area corresponding to the marked second annotations; and training a machine learning model based on the first annotations marked while in the online mode on the first AR recording device and the second annotations marked while in the offline mode.

2. The method of claim 1, wherein the 3D mesh is captured by the first recording device or another recording device and stored on a first computing device, and wherein the method further comprises:

storing the marked first annotations on the first computing device; and storing the marked second annotations on the first computing device.

3. The method of claim 2, wherein the 3D mesh with the first projection is retrieved by and displayed on a second computing device associated with the first user, and wherein the first user marks the second annotations using the second computing device while in the offline mode.

4. The method of claim 3, wherein the 3D mesh with the second projection is displayed on the first recording device while in the offline mode.

5. The method of claim 3, wherein the 3D mesh with the first projection is retrieved by and displayed on a third computing device associated with a second user, and wherein the second user marks the second annotations using the third computing device while in an offline mode.

6. The method of claim 5, wherein the 3D mesh with the second projection is displayed on the third computing device while in the offline mode.

7. The method of claim 5, further comprising at least one of:

editing, using the second computing device or the third computing device while in the second mode, the first or second annotations for the physical object; and editing, using the first recording device while in the online mode or the offline mode, the first or second annotations for the physical object.

8. The method of claim 2, further comprising:

capturing, by the first recording device while in the online mode, additional images of the scene based on instructions provided to the first user and displayed on the first recording device.

9. The method of claim 2, further comprising storing data associated with the plurality of physical objects, wherein the data includes one or more of:

a 3D real-world location of a respective physical object;
a projected view of the respective physical object;
a class or description of the respective physical object;
a state associated with the respective physical object; and
metadata associated with an image of the respective physical object.

10. The method of claim 2, wherein marking the first or second annotations for the physical object comprises one or more of:

creating or selecting a class associated with the physical object;

storing the class on the first computing device;

creating or selecting a status associated with the physical object; and storing the status on the first computing device.

11. The method of claim 2, further comprising:

allowing a plurality of users associated with recording devices or computing devices to mark annotations for any physical object displayed in a same 3D mesh in the online mode and the offline mode;

storing the annotations marked by the plurality of users; and displaying, for the plurality of users on a respective recording device or a respective computing device, corresponding projections indicating 2D bounding areas in real time as a respective annotation is marked and stored.

12. The method of claim 1, wherein marking the first annotations and marking the second annotations comprises indicating a 3D bounding area corresponding to the physical object.

13. A computer system, the system comprising:

a processor; and a storage device storing instructions that when executed by the processor cause the processor to perform a method, the method comprising:

obtaining, by a first recording device based on input from one or more sensors, a three-dimensional (3D) mesh of a scene with a plurality of physical objects;

marking, by the first recording device while in a first mode, first annotations for a physical object displayed in the 3D mesh, wherein marking while in the first mode comprises a user associated with the first recording device moving around the scene and marking the first annotations in a live view setting by using tools on the first recording device;

switching from the first mode to a second mode by setting a mode on the first recording device;

displaying, on the first recording device while in the second mode, the 3D mesh including a first projection indicating a two-dimensional (2D) bounding area corresponding to the marked first annotations;

marking, by the first recording device while in the second mode, second annotations for the physical object or another physical object displayed in the 3D mesh, wherein marking while in the second mode comprises the user marking the second annotations in a static view setting by using the tools on the first recording device or an input device;

switching from the second mode to the first mode by setting the mode on the first recording device; and displaying, on the first recording device while in the first mode, the 3D mesh including a second projection indicating a 2D bounding area corresponding to the marked second annotations.

14. The computer system of claim 13, wherein the 3D mesh is captured by the first recording device or another recording device and stored on a first computing device, and wherein the method further comprises:

storing the marked first annotations on the first computing device; and storing the marked second annotations on the first computing device.

15. The computer system of claim 14,
wherein the first mode comprises an online mode in which a first user associated with the first recording device moves around the scene to mark the first annotations in a live view setting, and
wherein the second mode comprises an offline mode in which the first user associated with the first recording device uses tools on the first recording device to mark the second annotations in a static view setting.

16. The computer system of claim 15, further comprising at least one of:
wherein the 3D mesh with the first projection is retrieved by and displayed on a second computing device associated with the first user, and wherein the first user marks the second annotations using the second computing device while in the offline mode;
wherein the 3D mesh with the second projection is displayed on the first recording device while in the offline mode;
wherein the 3D mesh with the first projection is retrieved by and displayed on a third computing device associated with a second user, and wherein the second user marks the second annotations using the third computing device while in an offline mode; and
wherein the 3D mesh with the second projection is displayed on the third computing device while in the offline mode.

17. The computer system of claim 16, further comprising at least one of:
editing, using the first recording device while in the first mode or the second mode or using the second computing device or the third computing device while in the second mode, the first or second annotations for the physical object;
allowing a plurality of users associated with the first recording device, the second computing device, the third computing device, other recording devices, or other computing devices to mark annotations for any physical object displayed in a same 3D mesh while in the online mode and the offline mode;
storing the annotations marked by the plurality of users; and
displaying, for the plurality of users on a respective recording device or a respective computing device, corresponding projections indicating 2D bounding areas in real time as a respective annotation is marked and stored.

18. The computer system of claim 13, further comprising:
capturing, by the first recording device while in the first mode, additional images of the scene based on instructions provided to the first user and displayed on the first recording device.

19. An apparatus comprising a recording device, which comprises:
a mesh-obtaining module configured to obtain, based on input from one or more sensors, a three-dimensional (3D) mesh of a scene with a plurality of physical objects;
an annotation-marking module configured to mark, while in a first mode, first annotations for a physical object displayed in the 3D mesh, wherein marking while in the first mode comprises a user associated with the recording device moving around the scene and marking the first annotations in a live view setting by using tools on the recording device;
a display-managing module configured to switch from the first mode to a second mode by setting a mode on the recording device;
wherein the display-managing module is further configured to display, while in the second mode, the 3D mesh including a first projection indicating a two-dimensional (2D) bounding area corresponding to the marked first annotations;
wherein the annotation-marking module is further configured to mark, while in the second mode, second annotations for the physical object or another physical object displayed in the 3D mesh, wherein marking while in the second mode comprises the user marking the second annotations in a static view setting by using the tools on the recording device or an input device;
wherein the display-managing module is further configured to switch from the second mode to the first mode by setting the mode on the recording device; and
wherein the displaying-managing module is further configured to display, while in the first mode, the 3D mesh including a second projection indicating a 2D bounding area corresponding to the marked second annotations.

* * * * *